United States Patent Office.

LUIGI IMPERATORI, OF DUSSELDORF, PRUSSIA, GERMANY.

EXTRACTION OF PHOSPHATE SODA FROM SLAGS.

SPECIFICATION forming part of Letters Patent No. 324,471, dated August 18, 1885.

Application filed May 26, 1885. (No specimens.)

*To all whom it may concern:*

Be it known that I, LUIGI IMPERATORI, a subject of the King of Italy, residing at Dusseldorf, in the Kingdom of Prussia, German Empire, have invented new and useful Improvements in the Extraction of Phosphate of Soda or of Potash from Thomas Slags and other Phosphates, of which the following is a specification.

The process which forms the subject of the present application for Letters Patent has for its object the conversion of the phosphoric acid contained in Thomas Gilchrist process slags and other materials containing phosphates of lime into a combination soluble in water, as hereinafter described. The slag, suitably crushed and pulverized, is mixed with carbon and sulphate of soda. The same proportion of carbon to sulphate of soda is employed as in the Leblanc process—say about forty parts C per one hundred $Na_2SO_4$. With a weathered basic process slag containing, say, per one hundred parts fifty parts lime, five parts magnesia, nineteen parts iron, twenty parts phosphoric acid, six parts silicic acid, the following reactions are obtainable on smelting it with carbon and sulphate of soda:
(*a*.) The lime, uncombined with phosphoric or silicic acid, yields with sulphate of soda $Na_2CO_3$, or, if the slag has not been weathered, $Na_2O$, as in the Leblanc process. (*b*.) The iron, in the shape of FeO and $Fe_2O_3$, also yields with carbon and sulphate of soda $Na_2O$ and sulphide of iron. (*c*.) The phosphate of lime, sulphate of soda, and carbon yield, finally, sulphide of calcium and basic phosphate of soda. The process carries out the reaction expressed by the equation $Ca_3(PO_4)_2+3Na_2SO_4+6C=3CaS+2Na_3PO_4+6CO_2$. The silicic acid of the slag is obtained also in the fluxed mass combined with lime.

The following equations serve to indicate the proportions of soda salt to phosphate required:

$$\frac{56(CaO)}{142(Na_2SO_4)}=\frac{50}{x} \text{ (CaO of the slag) } x=128$$

$$\frac{40(MgO)}{142(Na_2SO_4)}=\frac{5}{x^2} \text{ (MgO of the slag) } x^2=18$$

$$\frac{56(Fe)}{142(Na_2SO_4)}=\frac{12}{x^3} \text{ (iron of the slag) } x^3=30$$

Total.................................... 176

Theoretically, therefore, the proportions are: slag, one hundred parts; sulphate of soda, one hundred and seventy-six parts; coal, seventy-four parts. In practice, however, a considerable excess of slag is advisable. The mixture is then put into a black-ash furnace and fluxed and worked as usual in the Leblanc process, whereby a semi-fluid mass is obtained, which is molded into blocks. These blocks are not broken up and lixiviated on cooling, as in the ordinary soda process, but subjected to special treatment, as follows: At the high temperature at which the reactions take place there occurs also partial decomposition of $Na_2CO_3$ and CaS with loss of carbonic acid, according to the equation $Na_2CO_3+CaS=Na_2S+CaO+CO_2$. Moreover, the excess of slag used produces a certain quantity of free lime. This free lime causes the soluble phosphate to revert almost entirely if the fluxed mass be lixiviated directly with water. To avoid this the mass is previously treated with carbonic acid, so as to convert the caustic lime into carbonate. The carbonic acid may be supplied in various ways—for instance, (*a*,) in the form of gas, the blocks are crushed to the size of nuts, put into a scrubber, and gas passed through; or (*b*) the broken-up mass is mixed with bicarbonate of soda, the mixture ground, warmed to 100° centigrade, and lixiviated; or (*c*) the broken-up mass is treated with a saturated solution of soda through which carbonic acid has been passed until it is no longer clear, and subsequently ground to the consistency of mortar, through which carbonic acid is passed.

During the carbonic-acid treatment a portion of the sulphide of calcium is also decomposed into sulphureted hydrogen and carbonate of lime, and the basic phosphate of soda—$Na_3PO_4$—converted into neutral phosphate of soda—$Na_2HPO_4$. After this operation the mass is lixiviated together with the neutral phosphate of soda. Large quantities of carbonate of soda are dissolved out. Both salts may be obtained and separated by crystallization. The larger the percentage of free lime in the material the greater the quantity of carbonate of soda in the product. The process is obviously applicable to other sources of phosphoric acid besides the Thomas Gilchrist process slags.

Instead of sulphate of soda, sulphate of potash may be made use of.

Having now particularly described and ascertained the nature of the said invention, and in what manner the same is to be performed, I declare that what I claim is—

The process for obtaining phosphate of potash or soda from Thomas Gilchrist process for producing slags or other phosphatic materials, which consists in first smelting the same with sulphate of potash or soda and carbon and subsequently treating the product with carbonic acid, substantially as described.

In testimony whereof I have signed my name to this specification in the presence of two subscribing witnesses.

LUIGI IMPERATORI.

Witnesses:
 TH. PEITMANN,
 J. PRALLENBON.